United States Patent
Cha et al.

(10) Patent No.: US 7,396,877 B2
(45) Date of Patent: Jul. 8, 2008

(54) CHEMICAL RESISTANT THERMOPLASTIC RESIN COMPOSITION

(75) Inventors: Sung-je Cha, Seoul (KR); Sung-tae Ahn, Daejeon (KR); Dong-chul Kim, Daejeon (KR); Yun-kyoung Cho, Daejeon (KR)

(73) Assignee: LG Chem, Ltd. (KR)

( * ) Notice: Subject to any disclaimer, the term of this patent is extended or adjusted under 35 U.S.C. 154(b) by 301 days.

(21) Appl. No.: 11/248,527

(22) Filed: Oct. 12, 2005

(65) Prior Publication Data

US 2006/0079639 A1    Apr. 13, 2006

(30) Foreign Application Priority Data

Oct. 12, 2004    (KR) .................. 10-2004-0081395

(51) Int. Cl.
*C08L 51/04* (2006.01)
(52) U.S. Cl. ............................ 525/71; 525/80; 525/83; 525/84; 525/85
(58) Field of Classification Search .............. 525/71, 525/80, 83, 84, 85
See application file for complete search history.

(56) References Cited

U.S. PATENT DOCUMENTS 6,284,830 B1 *  9/2001  Gottschalk et al. .......... 524/449
2002/0082374 A1 *  6/2002  Schaedler et al. ........ 526/317.1

FOREIGN PATENT DOCUMENTS

JP         10-338794        12/1998

\* cited by examiner

*Primary Examiner*—Jeffrey C Mullis
(74) *Attorney, Agent, or Firm*—Cantor Colburn LLP

(57) ABSTRACT

Disclosed is a resin composition comprising (A) 100 parts by weight of a base resin comprising a rubber-modified styrene-containing graft copolymer and a styrene-containing copolymer; (B) 0.5-8 parts by weight of an acrylic rubber graft copolymer resin having an average particle size of 0.1-0.5 μm; and (C) 0.5-8 parts by weight of a graft copolymer resin comprising an ethylene α-olefinic copolymer rubber having an average particle size of 0.1-0.8 μm. The thermoplastic resin composition of the present invention greatly improves chemical resistance to insulating materials, such as urethane foam, or foaming agent compounds, such as freon (CFC-11, HCFC-141b, HFC-245fa, HFC-245eb, HFC-245ca, HFC-356mffm) and cyclopentane and offers superior impact strength, whiteness and processability. It can be useful for extrusion sheets of refrigerator interiors.

18 Claims, No Drawings

CHEMICAL RESISTANT THERMOPLASTIC RESIN COMPOSITION

This application claims the benefit of the filing date of Korean Patent Application No. 10-2004-0081395, filed on Oct. 12, 2004, in the Korean Intellectual Property Office, the disclosure of which is incorporated herein in its entirety by reference.

TECHNICAL FIELD

The present invention relates to a chemical resistant thermoplastic styrenic resin composition. More particularly, it relates to a thermoplastic resin composition having superior chemical resistance, impact strength and whiteness by introducing a graft copolymer resin comprising an acrylic graft copolymer resin and an ethylene α-olefinic copolymer rubber, as a modifier, to an acrylonitrile-butadiene-styrene copolymer base resin (hereunder referred to as "ABS resin").

BACKGROUND ART

Because of superior processability, coloring ability and luster as well as superior impact resistance and strength, ABS resin is widely used for electric/electronic housings and automobile interior/exterior materials. When used for internal parts of a refrigerator, the ABS resin requires resistance against foaming agent in addition to the afore-mentioned properties.

It is because foaming agents, such as freon (CFC-11, HCFC-141b, HFC-245fa, HFC-245eb, HFC-245ca, HFC-356mffm) or cyclopentane, used to form urethane foams in making the insulation layer of a refrigerator may contact the resin during or after the manufacturing process, thereby causing chemical crack and cracking of the resin at the site where internal stress is concentrated.

As conventional methods of improving chemical resistance, increasing content of vinyl cyanide compound in ABS resin, increasing rubber content, increasing molecular weight of acrylonitrile-styrene copolymer resin (hereunder referred to as "SAN resin"), etc. are known. However, increasing content of vinyl cyanide compound may cause yellowing and reduced fluidity during processing of the resin. Increasing rubber content or increasing molecular weight of SAN resin may also cause worse resin processability.

Japanese Patent Laid-Open No. Hei 10-338794 introduces an ethylene-containing terpolymer in order to improve chemical resistance. But, thermal stability of the resin is lowered because the compound is decomposed at high temperature during compounding.

In order to solve the problem of the ABS resin composition, the present inventors developed a thermoplastic styrenic resin having superior chemical resistance by introducing a rubber graft copolymer.

DISCLOSURE

It is an object of the present invention to provide a thermoplastic resin composition having superior chemical resistance.

It is another object of the invention to provide a thermoplastic resin composition having superior impact strength.

It is still another object of the present invention to provide a thermoplastic resin composition having superior whiteness.

It is still another object of the present invention to provide a thermoplastic resin composition having superior processability.

The afore-mentioned objects and other objects can be attained by the present invention as described below.

Hereunder is given a detailed description of the present invention.

The present invention provides a styrenic thermoplastic resin composition comprising:

100 parts by weight of a resin comprising 20-40 parts by weight of a rubber-modified styrene-containing graft copolymer and 60-80 parts by weight of a styrene-containing copolymer;

0.5-8 parts by weight of an acrylic rubber-modified copolymer resin; and 0.5-8 parts by weight of a graft copolymer resin comprising ethylene α-olefinic copolymer rubber.

More particularly, the present invention provides a styrenic thermoplastic resin composition comprising:

(A) 100 parts by weight of a resin comprising 20-40 parts by weight of a g-ABS resin prepared from a rubbery polymer having an average particle size of 0.05-0.40 μm by emulsion graft polymerization and 60-80 parts by weight of a styrene-containing copolymer;

(B) 0.5-8 parts by weight of an acrylic rubber-modified copolymer resin having a rubber particle size of 0.1-0.5 μm; and (C) 0.5-8 parts by weight of a graft copolymer resin comprising an ethylene α-olefinic copolymer rubber having an average particle size of 0.1-0.8 μm.

Optionally, the styrenic thermoplastic resin composition may selectively comprise a specific hindered phenolic antioxidant or a phosphite antioxidant. Hereunder is given a description of each constituent.

(A) Graft Copolymer

The rubber-modified styrene-containing graft copolymer may comprise 30-65 parts by weight of at least one selected from the group consisting of styrene and substituted styrene, such as α-methylstyrene, p-methylstyrene, vinyltoluene and t-butylstyrene; 10-30 parts by weight of at least one selected from the group consisting of acrylonitrile, methacrylonitrile and ethacrylonitrile; and 10-60 parts by weight of a rubber.

Preferably, the rubber has a particle size of 0.05-0.4 μm and is at least one selected from the group consisting of polybutadiene, a styrene-butadiene copolymer, polyisoprene and a butadiene-isoprene copolymer. If the rubber has a particle size smaller than 0.05 μm, impact strength may be not enough. Otherwise, if it is larger than 0.4 μm, luster may be insufficient.

Although the rubber-modified styrene-containing graft copolymer may be prepared by any polymerization method, it is preferably prepared by bulk polymerization and emulsion polymerization. Particularly, an acrylonitrile/butadiene/styrene (ABS) resin in which acrylonitrile and styrene are grafted into a butadiene rubber is preferable.

The styrene-containing copolymer may comprise 50-90 parts by weight of at least one selected from the group consisting of styrene and substituted styrene, such as α-methylstyrene, p-methylstyrene, vinyltoluene and t-butylstyrene; and 10-50 parts by weight of at least one selected from the group consisting of acrylonitrile, methacrylonitrile and ethacrylonitrile.

Although the styrene-containing copolymer may be prepared by any polymerization method, it is preferably prepared by bulk polymerization and emulsion polymerization. The copolymer may have a weight-average molecular weight of 50,000-200,000. If the styrene-containing copolymer has a weight-average molecular weight smaller than 50,000, chemical resistance and impact strength may be insufficient. Otherwise, if it is larger than 200,000, fluidity of the resin may decrease during processing.

(B) Acrylic Rubber-Modified Copolymer Resin

The acrylic rubber-modified copolymer composition comprises 5-15 parts by weight of a seed in which alkyl acrylate is polymerized; 45-75 parts by weight of a core in which alkyl acrylate is polymerized; and 20-50 parts by weight of a shell in which alkyl methacrylate and/or alkyl acrylate is polymerized.

The seed may comprise 95.0-99.95 wt % of alkyl acrylate in which the alkyl group has 2-8 carbon atoms.

The core may comprise 95.0-99.95 wt % of alkyl acrylate in which the alkyl group has 2-8 carbon atoms.

The shell may comprise 90-100 wt % of alkyl methacrylate in which the alkyl group has 1-4 carbon atoms; and 0-10 wt % of alkyl acrylate in which the alkyl group has 1-4 carbon atoms.

The alkyl acrylate in which the alkyl group has 2-8 carbon atoms may be at least one selected from the group consisting of methyl acrylate, ethyl acrylate, propyl acrylate, isopropyl acrylate, butyl acrylate, hexyl acrylate, octyl acrylate, 2-ethylhexyl acrylate, a homopolymer of these monomers and a copolymer thereof.

The alkyl methacrylate in which the alkyl group has 1-4 carbon atoms may be at least one selected from the group consisting of methyl methacrylate, ethyl methacrylate, propyl methacrylate, isopropyl methacrylate and butyl methacrylate.

The alkyl acrylate in which the alkyl group has 1-4 carbon atoms may be at least one selected from the group consisting of ethyl acrylate, methyl acrylate and butyl acrylate.

The acrylic rubber-modified copolymer may have a rubber particle size of 0.1-0.5 µm. If the rubber particle size is smaller than 0.1 µm, impact strength may be insufficient. Otherwise, if it is larger than 0.5 µm, luster may be insufficient.

Preferably, the acrylic rubber-modified copolymer has a weight-average molecular weight of 50,000-200,000. If the acrylic rubber-modified copolymer has a weight-average molecular weight smaller than 50,000, chemical resistance or impact strength may be insufficient. Otherwise, if it is larger than 200,000, fluidity may be insufficient.

If the content of the acrylic rubber-modified copolymer resin is below 0.5 part by weight, improvement of chemical resistance is only slight. Otherwise, if it exceeds 8 parts by weight, impact strength may be insufficient.

(C) Graft Copolymer Resin Comprising ethylene α-olefinic Copolymer Rubber

The graft copolymer resin comprising an ethylene α-olefinic copolymer rubber may comprise 30-65 parts by weight of at least one selected from the group consisting of styrene and substituted styrene, such as α-methylstyrene, p-methylstyrene, vinyltoluene and t-butylstyrene; acrylonitrile, 10-40 parts by weight of at least one selected from the group consisting of methacrylonitrile and ethacrylonitrile; and 10-60 parts by weight of an ethylene α-olefin rubber polymer.

In the ethylene α-olefinic copolymer rubber, the α-olefin has 3-8 carbon atoms. The α-olefin may be propylene, 1-butene, 1-pentene, 1-hexene, 1-octene, etc. Among these, propylene is the most preferable.

In the ethylene α-olefinic copolymer rubber, proportion of ethylene to α-olefin by weight is, in general, 10-90 to 90-10, preferably 55-70 to 45-30.

The acrylic rubber-modified copolymer may have a rubber particle size of 0.1-0.8 µm. If the rubber particle size is smaller than 0.1 µm, impact strength may be insufficient. Otherwise, if it is larger than 0.8 µm, luster may be insufficient.

Preferably, the ethylene α-olefinic copolymer rubber has a weight-average molecular weight of 100,000-400,000. If the ethylene α-olefinic copolymer rubber has a weight-average molecular weight smaller than 100,000, chemical resistance and impact strength may be insufficient. Otherwise, if it is larger than 400,000, fluidity may be insufficient.

If the content of the graft copolymer resin comprising an ethylene α-olefinic copolymer rubber is below 0.5 part by weight, improvement of chemical resistance is only slight. Otherwise, if it exceeds 8 parts by weight, whiteness may be not good enough.

The styrenic thermoplastic resin composition of the present invention may further comprise, in addition to the afore-mentioned constituents, a hindered phenolic antioxidant, a phosphite antioxidant or at least one additive selected from the group consisting of a lubricant, a heat stabilizer, an antioxidant, a photostabilizer, an anti-dropping agent, a pigment and an inorganic filler, as required.

The styrenic thermoplastic resin composition of the present invention may be blended by a conventional method.

Best Mode

Hereinafter, the present invention is described in further detail through examples. However, the following examples are only for the understanding of the invention and the invention is not limited to or by them.

EXAMPLES AND COMPARATIVE EXAMPLES

Graft copolymer resin, SAN copolymer resin, acrylic rubber-modified copolymer resin and ethylene α-olefinic copolymer rubber used in Examples and Comparative Examples were as follows.

Graft Copolymer Resin

A core-shell type G-ABS resin prepared from emulsion polymerization of a rubbery polymer having a rubber particle diameter of 0.3 µm was used.

SAN Copolymer Resin

A SAN resin having an acrylonitrile content of 30-35% and a weight-average molecular weight of 150,000-200,000 was used.

Acrylic rubber-modified copolymer resin

An acrylic rubber-modified copolymer resin IM808 (LG Chem.) was used.

Graft Copolymer Resin Comprising ethylene α-olefinic Copolymer Rubber

Royaltuf 372P20 (Crompton), an ethylene α-olefinic rubber-modified copolymer resin, was used.

Styrenic thermoplastic resin compositions were prepared with the composition given in Table 1 below.

TABLE 1

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Graft copolymer resin (g-ABS) | 30 | 30 | 30 | 30 | 30 | 30 | 30 | 30 | 50 |
| SAN | 70 | 70 | 70 | 70 | 70 | 70 | 70 | 70 | 50 |
| Acrylic rubber copolymer resin | 1 | 3 | 5 | 0 | 10 | 5 | 6 | 0 | 0 |
| Ethylene α-olefinic rubber copolymer resin | 5 | 3 | 1 | 0 | 5 | 10 | 0 | 6 | 0 |

TESTING EXAMPLE

Physical properties measured as follows.

Chemical resistance was measured with a specially designed jig using 195 mm×19 mm×3 mm samples. Each sample was fixed by the jig for each strain. After putting the sample was in a desiccator, 350 mL of HCFC-141b was injected and the desiccator was covered. It was let alone for 18 hours at −20° C. and then for 4 hours at room temperature. The sample was taken out and the jig value with no crack when bent was measured after 30 minutes.

Impact strength was measured according to ASTM D256 (¼", 23° C.). (Unit: kg·cm/cm)

Fluidity (Melt index) was measured according to ASTM D1238. (Unit: g/10 min)

Luster was measured according to ASTM D2985.

Whiteness was measured and compared using the Hunter calorimeter (Hunter Lab., U.S.).

Physical property measurement result for Examples 1-3 and Comparative Examples 1-6 is summarized in Table 2 below.

TABLE 2

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Chemical resistance (jig value) | 0.8 | 0.9 | 0.8 | 0.2 | 0.8 | 0.8 | 0.7 | 0.8 | 0.9 |
| Impact strength | 36 | 34 | 31 | 31 | 24 | 34 | 21 | 35 | 43 |
| Whiteness | 32 | 45 | 38 | 32 | 42 | 25 | 50 | 24 | 24 |
| Melt index | 5.8 | 5.9 | 5.7 | 5.7 | 4.0 | 4.2 | 5.5 | 5.4 | 3.7 |
| Luster | 90 | 90 | 91 | 87 | 90 | 89 | 91 | 91 | 88 |

As seen in Table 2, the resin compositions of Examples 1-3, in which a graft copolymer resin comprising an acrylic rubber copolymer resin and ethylene α-olefinic copolymer rubber was introduced, showed superior chemical resistance, impact strength, whiteness compared with those of Comparative Examples 1-6. The resin composition of Comparative Example 1, in which the rubber copolymer resin was not introduced, had poor chemical resistance. The resin compositions with higher rubber copolymer resin contents (Comparative Examples 2 and 3) showed increased chemical resistance but decreased fluidity, impact strength or whiteness. When only the acrylic rubber copolymer resin was introduced (Comparative Example 4), impact strength decreased. When a graft copolymer resin comprising only an ethylene α-olefinic copolymer rubber was introduced (Comparative Example 5), whiteness decreased significantly. When the content of ABS rubber was increased to improve chemical resistance (Comparative Example 6), melt index decreased.

INDUSTRIAL APPLICABILITY

As apparent from the above description, the thermoplastic resin composition of the present invention, in which a graft copolymer resin comprising an ethylene α-olefinic copolymer rubber and an acrylic rubbery polymer resin is introduced a G-ABS polymer resin, offers superior impact strength and whiteness, as well as superior chemical resistance.

While the present invention has been described in detail with reference to the preferred embodiments, those skilled in the art will appreciate that various modifications and substitutions can be made thereto without departing from the spirit and scope of the present invention as set forth in the appended claims.

The invention claimed is:

1. A styrenic thermoplastic resin composition comprising:
   100 parts by weight of a resin comprising 20-40 parts by weight of a rubber-modified styrene-containing graft copolymer and 60-80 parts by weight of a styrene-containing copolymer;
   0.5-8 parts by weight of an acrylic rubber-modified copolymer resin; and
   0.5-8 parts by weight of a graft copolymer resin comprising an ethylene α-olefininc copolymer rubber,
   wherein the acrylic rubber-modified copolymer composition comprises:
   5-15 parts by weight of a seed in which alkyl acrylate is polymerized;
   45-75 parts by weight of a core in which alkyl acrylate is polymerized; and
   10-50 parts by weight of a shell in which alkyl methacrylate and/or alkyl acrylate is polymerized.

2. The styrenic thermoplastic resin composition of claim 1, wherein the rubber-modified styrene-containing graft copolymer comprises:
   30-65 parts by weight of styrene, α-methylstyrene, p-methylstyrene, vinyltoluene or t-butylstyrene;
   10-30 parts by weight of acrylonitrile, methacrylonitrile or ethacrylonitrile; and
   10-60 parts by weight of a rubber.

3. The styrenic thermoplastic resin composition of claim 2, wherein the rubber has an average particle size of 0.05-0.4 μm and selected from the group consisting of a polybutadiene, a styrene-butadiene copolymer, a polyisoprene and a butadiene-isoprene copolymer.

4. The styrenic thermoplastic resin composition of claim 1, wherein the styrene-containing copolymer comprises:
   50-90 parts by weight of α-methylstyrene, p-methylstyrene, vinyltoluene or t-butylstyrene; and
   10-50 parts by weight of acrylonitrile, methacrylonitrile or ethacrylonitrile.

5. The styrenic thermoplastic resin composition of claim 1, wherein the styrene-containing copolymer has a weight-average molecular weight of 50,000-200,000.

6. The styrenic thermoplastic resin composition of claim 1, wherein the acrylic rubber-modified copolymer has a rubber average particle size of 0.1-0.5 μm.

7. The styrenic thermoplastic resin composition of claim 1, wherein the acrylic rubber-modified copolymer polymer has a weight-average molecular weight of 50,000-200,000.

8. The styrenic thermoplastic resin composition of claim 1, wherein the x-olefin of the ethylene α-olefin copolymer rubber is selected from the group consisting of propylene, 1-butene, 1-pentene, 1-hexene and 1-octene.

9. The styrenic thermoplastic resin composition of claim 1, wherein the ethylene α-olefin copolymer rubber has a rubber average particle size of 0.1-0.8 μm.

10. The styrenic thermoplastic resin composition of claim 1, wherein the ethylene α-olefin copolymer rubber has a weight-average molecular weight of 100,000-400,000.

11. An extrusion sheet prepared from the styrenic thermoplastic resin composition of claim 1.

12. The styrenic thermoplastic resin composition of claim 2, wherein the styrene-containing copolymer comprises:
    50-90 parts by weight of α-methylstyrene, p-methylstyrene, vinyltoluene or t-butylstyrene; and
    10-50 parts by weight of acrylonitrile, methacrylonitrile or ethacrylonitrile.

13. The styrenic thermoplastic resin composition of claim 2, wherein the styrene-containing copolymer has a weight-average molecular weight of 50,000-200,000.

14. The styrenic thermoplastic resin composition of claim 2, wherein the acrylic rubber-modified copolymer composition comprises:
    5-15 parts by weight of a seed in which alkyl acrylate is polymerized;
    45-75 parts by weight of a core in which alkyl acrylate is polymerized; and
    10-50 parts by weight of a shell in which alkyl methacrylate and/or alkyl acrylate is polymerized.

15. The styrenic thermoplastic resin composition of claim 6, wherein the acrylic rubber-modified copolymer has a rubber average particle size of 0.1-0.5 μm.

16. The styrenic thermoplastic resin composition of claim 6, wherein the acrylic rubber-modified copolymer polymer has a weight-average molecular weight of 50,000-200,000.

17. The styrenic thermoplastic resin composition of claim 8, wherein the ethylene α-olefin copolymer rubber has a rubber average particle size of 0.1-0.8 μm.

18. The styrenic thermoplastic resin composition of claim 8, wherein the ethylene α-olefin copolymer rubber has a weight-average molecular weight of 100,000-400,000.

* * * * *